(12) United States Patent
Rombola

(10) Patent No.: US 6,518,587 B2
(45) Date of Patent: *Feb. 11, 2003

(54) DETECTION AND CORRECTION OF DEFECTS FROM SCANNER CALIBRATION REFERENCES

(75) Inventor: Gregory Rombola, Spencerport, NY (US)

(73) Assignee: Heidelberger Druckmaschinen AG, Heidelberg (DE)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/572,416

(22) Filed: May 17, 2000

(65) Prior Publication Data

US 2002/0185616 A1 Dec. 12, 2002

(51) Int. Cl.⁷ .................................................. G01V 8/00
(52) U.S. Cl. ................................ 250/559.1; 250/559.45
(58) Field of Search ...................... 250/559.1, 559.45, 250/559.4, 234, 235; 358/474, 504, 406; 235/470, 462.45, 472.01; 356/237.4, 237.5

(56) References Cited

U.S. PATENT DOCUMENTS

| | | | | |
|---|---|---|---|---|
| 5,621,217 A | * | 4/1997 | Seachman et al. | 250/559.1 |
| 5,699,494 A | | 12/1997 | Colbert et al. | 395/114 |
| 5,798,847 A | * | 8/1998 | Aerts | 358/464 |
| 5,802,217 A | | 9/1998 | Suzuki et al. | 382/274 |
| 5,946,461 A | | 8/1999 | Landry et al. | 395/117 |
| 6,026,258 A | | 2/2000 | Fresk et al. | 399/87 |

OTHER PUBLICATIONS

Manual, "Adobe® Portable Document Formal Reference Manual, Version 1.3," pp. 2–518.
"Adobe® Acrobat 4.0 Guide," pp. 1–595.
Brochure, "Quite Imposing Plus Online Guide 1.2.".
Brochure, "W3C Extensible Markup Language (SML) 1.0," W3C Recommendation Feb. 10, 1998, pp. 1–32.
Brochure, "StampPDF™ Users Guide—An Acroboat Plugin," pp. 6–82, © 1999 Digital Applications, Inc.
Brochure, "TIFF™ Revision 6.0" Specification, pp. 4–120.
Manual, "TWAIN Specification Version 1.8," pp. 1–516.
Manual, "Open Document Management API, Version 2.0," pp. 1–87.
Brochure Guide, "Network Imaging System Interface Development Guide, Release 2," pp. 1–1–6–4.
Dan Phelps and John Thompson, "Rendering For Electronic Printers and Copiers," pp. 1–72.
Kodak Publication No. FN9074 5/85—"Fundamentals of Digital Copiers—Revision 1," pp. 1–49.

* cited by examiner

Primary Examiner—Robert H. Kim
Assistant Examiner—Jurie Yun

(57) ABSTRACT

Computation of digital gains and offsets used in digital scanners for shading correction (linearity correction) is particularly vulnerable to imperfections in the reference strips, particularly the light reference strip. It is extremely difficult and expensive to create references which are completely free of imperfections or contaminated in some way. This invention eliminates artifacts caused by the presence of small imperfections on the references. It does so by detecting the presence of an artifact and then excluding data contributed by the artifact from the calibration computation process.

11 Claims, 1 Drawing Sheet

DETECTION AND CORRECTION OF DEFECTS FROM SCANNER CALIBRATION REFERENCES

BACKGROUND OF THE INVENTION

The present invention relates generally to digital scanners, and more particularly to an arrangement and method for detecting and correcting defects from scanner calibration references.

One of the present uses of scanners is in the printing industry, and particularly in a production-printing environment. A digital scanner is a device that reads an image which is placed on the platen of the scanner and generates a digital image of the document. The scanner uses a light source to illuminate the document. Light is reflected from the light and dark areas of the image on the document, in proportion to the lightness of the original document. The light is passed by a focusing system, such as mirrors and lenses, to photodetector elements. The image is sequentially resolved into small points which are commonly referred to as pixels by the photodetector elements. The photodetector elements, in turn, convert the light into a proportional electrical signal at each point. In this manner, the tones of the original document are resolved into a pattern of proportional voltages. The photodistributions are arranged in lines and rows to form an array. After the individual voltages have been converted into an electrical signal, electronic circuitry may then be used to manipulate the image, such as changing the reproduction ratio or reversing black and white.

In a production printing environment, after the signal processing has been performed by the electronic circuitry, the resulting electrical signal is transmitted to a printer which uses the electrical signal to generate a document by modulating a light beam that scan across a photosensitive drum.

The photocells in the scanner may be any suitable photoelectric converter such as photodiodes, phototransistors and Charge-Coupled Devices (CCDs). CCDs are made up of a row of several thousand small photocells, each only a few microns square. The associated circuitry which is required for the scanning function is also built into the CCDs so the complete photoelectric converter is a one-chip microcircuit. The resolution of the original image will be proportional to the size of each pixel, so the image is resolved into blocks a few microns square. Generally, the level of CCD output signals decreases with an increased amount of light falling on each pixel. The electrical signals received from the CCD represent, in analog form, the (halftone) image density recorded by each pixel. The analog signals are converted to an equivalent digital signal by an analog to digital (A/D) converter. The digital signal from each of the lines are read and stored sequentially into a line memory.

Typically, a scanner will include shading-correction circuitry or may run shading-correction algorithms on a processor. Shading correction is necessary because the output of all the pixels of the CCD will not always be uniform even if the original is uniform in density across a fill scan line. There are various reasons for the non-uniformity. For example, the intensity of the scanning lamp may vary between its center and ends. Illumination lamps may have, for example, eight filaments, which may be a cause of non-uniformity. The amount of light that passes through the lenses may also be different for the center and edge of the lenses also causing non-uniformity. Additionally, the sensitivity of the several thousand individual photocells in the CCD may vary from the others. Further, as described below, commonly the sensor architecture may have several video channels. Differences in the channels will occur because the electronic gain and offset channels may not be matched perfectly. Additionally, the channel structure is arranged such that a seam or butt exists in the middle of the device between the channels. Accordingly, there is a need to match the various channels of data at the center of the device so that the seam or butt is not observable.

Due to the inherent nature of the non-uniformity of the signals reproduced by the CCD, it is desirable to provide efficient and reliable calibration arrangements and methods to compensate for the non-uniformity.

BRIEF SUMMARY OF THE INVENTION

The present invention is defined by the following claims, and nothing in this section should be taken as a limitation on those claims. The present invention is directed to a method for calibrating a scanner. First, the scanner to be calibrated scans a light reference strip. An algorithm is used to determine if a defect exists in the light reference strip. Data is excluded if the data is data from a defect in the light reference strip. The scanner is then calibrated with the data from the scanning of the light reference strip excluding data contributed by the defect in the light reference strip.

DETAILED DESCRIPTION OF THE PREFERRED EMBODIMENT

Figure 1:
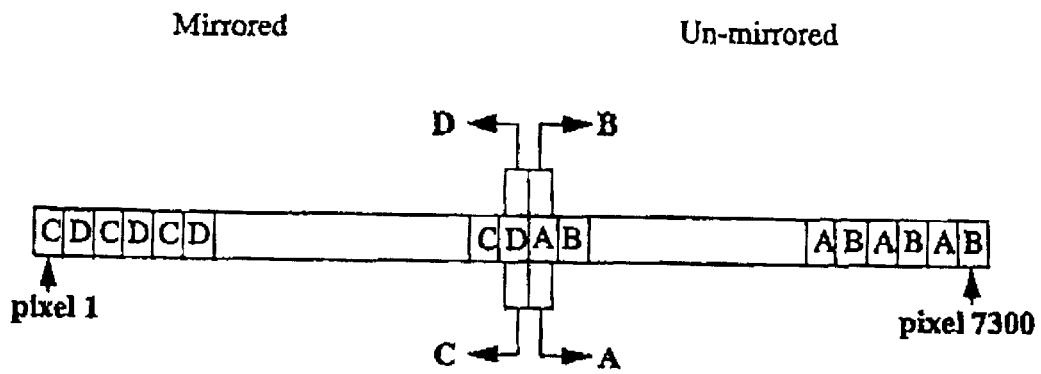
FIG. 1 is an illustration of a sensor architecture having four video channels.

Referring now to the drawings, FIG. 1 illustrates an exemplary embodiment of the sensor architecture for a scanner. In this embodiment, the scanner has 7300 active pixels. The sensor architecture has four video channels referred to as ABC and D. An even and odd channel on one side (A and B) and an even and odd channel (C and D) on another side. A seam or "butt" thus exists in the middle of the device. As discussed above, due to this architecture, channel differences will occur because the electronic gain and offset of each channel cannot be matched perfectly. Accordingly, to produce an accurate reproduction of the scanned document, some mechanism must be provided to compensate for these differences. Additionally, there is a need to match the four channels of data at the center of the device so that the butt is not observable in 8 bit images.

As discussed above, if a highly uniform continuous tone flat field original is scanned, the pixel values in the cross track (parallel to linear CCD sensor) direction are not uniformly the same value. There are several factors contributing to the non-uniformity. These factors include non-uniform response of each cell site in the sensor, channel electronic differences due to differences in the gain and offset electronics of the four channels as described above, non-uniformity across the array due to the illumination subsystem, and illumination level drop off on the extreme ends of the scan due to the lens.

In general, non-uniformity due to illumination system and lens drop off can be considered low frequency non-uniformity. Non-uniformity due to CCD defect and response uniformity and electronic channel differences can be considered high frequency non-uniformity.

To correct for these non-uniformity problems, scanners use a method that corrects the pixel values by a gain and offset so that when a continuous tone flat field is scanned, the corrected pixel values across the array all have the same value. Typically, this is accomplished by using an input correction algorithm. However, before the input pixel correction algorithm is applied to a scanned image, the CCD electronics are calibrated and a set of gain and offset correction factors are computed. The corrected pixel value may be computed from the following equation:

correctedpixel=gainfactor×inputpixel+offset

Two types of calibrations are used in scanners—electronic calibration and digital calibration. The primary objective of electronic calibration is to set the electronic gains and offsets of the various channels so that a desired scanner response range can be achieved. In the illustrated embodiment, the electronic gains and offsets must be set for the four channels. Because of the sensor architecture, it is essential that the gain and offset of the four channels are fine tuned to minimize odd and even channel differences and butt (center of sensor) differences.

In a preferred embodiment, this process occurs under software control. In a preferred calibration method, two reference strips of known reflection density are used to calibrate the scanner electronics. During the electronic calibration process, the light and dark reference strips are alternately scanned in an iterative process to adjust the electronic gain and offset of each channel. Table 1 below shows suitable reference strip specifications.

| Parameter | Light Reference | Dark Reference |
|---|---|---|
| Reflection Density | .15 (+/−0.05) | 1.35 (+/−0.05) |
| Quality Zone (inches) | 0.32 | 0.17 |
| Pixel Value for Specified Dynamic Range | 226 | 2 |

When this iterative process is complete, the channel to channel difference between C and D and the differences between A and B should be small. Also, the mean (average) of the C and D pixels in the vicinity of the sensor seam (about 100 pixels) should be very close to the mean of the A and B pixels which are in the vicinity of the seam.

In the process of adjusting the circuit gains, no pixel value is allowed to exceed the light reference pixel value. Pixels, which are less than the desired pixel value, are subsequently boosted by the gain provided by input pixel correction.

In the process of adjusting the circuit offsets, no pixel value is allowed to be less than the dark reference pixel value. Pixels which are greater than the desired pixel value are subsequently corrected by the offset provided by input pixel correction.

The process of adjusting the circuit gains and offsets to achieve the objectives defined above (minimal channel to channel differences between C and D and between A and B, minimal level difference between CD and AB side at seam, profile close to but not exceeding light reference value for light reference, profile close to but not less than dark reference value for dark reference) is a complex iterative process. One of the reasons is that the interaction between gain and offset adjustments.

As a practical matter, due to the iterative nature of this process, it is very likely that the scanner carriage assembly will be "parked" at the light or dark reference strip during the iterative adjustments. Thus, this process is vulnerable to reference strip imperfections or blemishes. One way to reduce this risk is to park the carriage at different locations within the quality zone of each strip when a move from one reference strip to another is required.

After circuit gain and offsets are set, the digital gain factors and offsets are computed. In this procedure, the two reference strips are scanned. The scanning of the light and dark references is preferably "moving" scans in order to obtain a large number of meaningful data points. The reference strips may be scanned at a slower speed than for normal scanning in order to obtain a larger number of scan lines.

This calibration step is performed under software control. For each pixel position an average of the light and dark references is computed as illustrated below in using the following equations:

$$\overline{darkpix} = \left(\sum_i darkpix\right) / (numberlines) \qquad \text{Equation 1}$$

$$\overline{lightpix} = \left(\sum_i lightpix\right) / (numberlines)$$

Given that the correct pixel value for the light reference is lightref and the correct value for the dark reference is darkref, then the gain and offset can be computed as follows:

gainfactor=(lightref−darkref)/(lightpix−darkpix) offset=darkref−(gain×darkpix)  Equation 2

Since these computations are preferably performed by the scanner CPU, maximum precision (i.e., float or double) should be carried prior to rounding.

Computation of digital gains and offsets is particularly vulnerable to imperfections in the reference strips, particularly the light reference strip. A large dark mark on the light reference strip could cause an erroneously high digital gain which could result in a white streak on flat fields. Use of moving scans to obtain image data can reduce this risk but not eliminate it. In the present invention an algorithm is first used to detect a defect or artifact. If a defect or artifact is detected another algorithm is used to exclude data contributed by the artifact from the calibration computation process.

The present invention uses a defect detection algorithm to identify pixel locations which may have reference strip defects. In a preferred embodiment, defect detection is implemented using a threshold method. For each pixel position, if the difference between the two values exceeds a certain threshold (the threshold for the dark reference is different from that for the light reference) then a defect is assumed. When this occurs, it is assumed that some of the lines of data for the given pixel are misrepresentative of the true reference target.

For a given pixel position, digital gain and offset parameters are computed by obtaining the average of many lines of scan data. Instead of averaging all the pixel values for each line, only the pixel values which are deemed to not be contaminated should be averaged.

Since this procedure is preferably performed under software control, execution time is a serious consideration. Several methods have been explored which attempt to identify which and how many pixel values to use in computing the average. One of these methods involved a sort routine which would sort the array based on value.

However, sorting is a time consuming process. A novel method has been discovered which yields good results. In the method of the present invention, the pixel data is stored in a histogram. The pixel value with the most occurrences is then identified from the histogram. Using this pixel value from the histogram, the average of the pixels within a specified range of this value is calculated and used.

Figure 2:
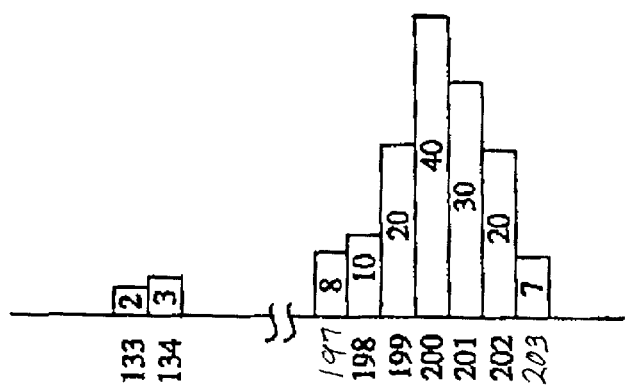
FIG. 2 is an illustration of a preferred embodiment implementing the algorithm of the present invention.

The range of vicinity over which to calculate the average is different for light and dark references. An example using the histogram graph below will be used to help illustrate this concept. Referring to FIG. 2, pixels values at 133 and 134 represent blemishes or defects in the reference strip. As can be seen, the maximum number of occurrences are 40 for pixel value 200. The total number of lines is 120. In an exemplary embodiment, the average is computed using 2 counts on either side of the maximum. Then the average will be:

$$(198*10+199*20+200*40+201*30+202*20)/(10+20+40+30+20).$$

Using this method, pixel values 133, 134, 197, and 203 are excluded from the calculation.

It will be apparent to those skilled in the art that the number of counts on either side of the maximum can be selected to be more or less counts than the illustration given above, depending on the particular situation.

Although the preferred embodiment above has been described using both a light and a dark reference strip to determine the gain and offset, the invention may be implemented using only the light reference strip to determine the gain.

It is therefore intended that the foregoing detailed description be regarded as illustrative rather than limiting, and that it is be understood that it is the following claims, including all equivalents, that are intended to define the spirit and scope of the invention.

What is claimed is:

1. A method for calibrating a scanner comprising:

scanning a light reference strip associated with a light reference threshold;

scanning a dark reference strip associated with a dark reference threshold, distinct from the light reference threshold;

determining that a defect exists in the light reference strip if a difference between any two scanned pixel values of the light reference strip exceeds the light reference threshold;

determining that a defect exists in the dark reference strip if a difference between any two scanned pixel values of the dark reference strip exceeds the dark reference threshold; and calibrating the scanner with data from the scanning of at least one of the light reference strip and the dark reference strip, the calibrating excluding defective data contributed by the defect in at least one of the light reference strip and the dark reference strip.

2. The method according to claim 1 wherein the calibrating comprises adjusting a gain of a scanning element associated with the scanned pixel values of the light reference strip not exceeding the difference.

3. The method according to claim 1 wherein the calibrating comprises adjusting a gain and an offset of a scanning element based on the light reference range and the dark reference range.

4. The method according to claim 1 wherein the calibration comprises adjusting a gain of the scanner pursuant to the following equations:

$$\text{gainfactor} = (\text{lightref} - \text{darkref})/(\overline{\text{lightpix}} - \overline{\text{darkpix}})$$

$$\overline{\text{darkpix}} = \left(\sum_i \text{darkpix}\right) / (\text{numberlines}), \text{ and}$$

$$\overline{\text{lightpix}} = \left(\sum_i \text{lightpix}\right) / (\text{numberlines}),$$

where lightref represents a correct pixel value for the light reference, and darkref represents a correct pixel value for the dark reference, numberlines is the number of scanning element lines used by the scanner during a scan of the light reference and the dark reference.

5. The method according to claim 1 wherein the calibration comprises adjusting the offset if the scanner pursuant to the following equations:

$$\text{offset} = \text{darkref} - (\text{gain} \times \overline{\text{darkpix}}),$$

$$\text{gainfactor} = (\text{lightref} - \text{darkref}(\overline{\text{lightpix}} - \overline{\text{darkpix}}), \text{ and}$$

$$\overline{\text{darkpix}} = \left(\sum_i \text{darkpix}\right) / (\text{numberlines}),$$

where lightref represents a correct pixel value for the light reference, and darkref represents a correct pixel value for the dark reference, numberlines is the number of scanning element lines used by the scanner during a scan of the light reference and the dark reference.

6. A method for calibrating a scanner having a plurality of pixels comprising:

scanning a light reference strip associated with a light reference range;

scanning a dark reference strip associated with a dark reference range: distinct from the light reference range;

storing the scanned data from at least one of the reference strips in at least one corresponding histogram;

determining a mode pixel with the pixel value that has the most occurrences with respect to the light reference range in the at least one histogram;

calculating the average of the pixels only within a specified light reference range of the pixel value with the most occurrences;

using the average to calibrate the scanner.

7. The method of claim 6, further comprising:

determining a mode pixel with the pixel valve that has the most occurrences with respect to the dark reference range of the at least one histogram;

calculating the average of the pixels only within a specified dark reference range of the pixel value with the most occurrences; and using the average to calibrate the scanner.

8. The method according to claim 6, wherein the calibrating comprises adjusting a gain of a scanning element associated with the scanned pixel values of the light reference strip.

9. The method according to claim 6, wherein the calibrating comprises adjusting a gain and an offset of a scanning element based on the light reference range and the dark reference range.

10. The method according to claim 6, wherein the calibration comprises adjusting a gain of the scanner pursuant to the following equations:

$$gainfactor = (lightref - darkref)/(\overline{lightpix} - \overline{darkpix}),$$

$$\overline{darkpix} = \left(\sum_i darkpix\right) / (numberlines), \text{ and}$$

$$\overline{lightpix} = \left(\sum_i lightpix\right) / (numberlines),$$

where lightref represents the correct pixel value for the light reference, and darkref represents the correct value for the dark reference, numberlines is the number of scanning element lines used by the scanner during a scan of the light reference and the dark reference.

11. The method according to claim 6, wherein the calibration comprises adjusting the offset if the scanner pursuant to the following equations:

$$offset = darkref - (gain \times \overline{darkpix}),$$

$$gainfactor = (lightref - darkref)l(\overline{lightpix} - \overline{darkpix}),$$

$$\overline{darkpix} = \left(\sum_i darkpix\right) / (numberlines),$$

where lightref represents a correct pixel value for the light reference, and darkref represents a correct pixel value for the dark reference, numberlines is the number of scanning element lines used by the scanner during a scan of the light reference and the dark reference.

* * * * *